United States Patent [19]

Leysen et al.

[11] 4,253,936

[45] Mar. 3, 1981

[54] METHOD OF PREPARING A MEMBRANE CONSISTING OF POLYANTIMONIC ACID POWDER AND AN ORGANIC BINDER

[75] Inventors: Roger F. R. Leysen, Mol; Philippe Vermeiren, Wemmel; Leon H. J. M. Baetsle, Mol; Gustaaf J. F. Spaepen, Dessel; Jan-Baptist H. Vandenborre, Kasterlee, all of Belgium

[73] Assignee: Studiecentrum voor Kernenergie, S.C.K., Brussel, Belgium

[21] Appl. No.: 130,131

[22] Filed: Mar. 13, 1980

[30] Foreign Application Priority Data

Mar. 20, 1979 [BE] Belgium ............................ 57673

[51] Int. Cl.³ ............... C25B 13/00; C25B 13/08; H01M 2/16
[52] U.S. Cl. ................................ 204/296; 429/251; 260/37 R
[58] Field of Search ............ 204/295, 296; 260/37 R

[56] References Cited

U.S. PATENT DOCUMENTS

| 3,346,422 | 10/1967 | Berger | 427/115 |
| 3,392,103 | 7/1968 | Berger | 204/295 |
| 3,437,580 | 4/1969 | Arrance et al. | 204/295 |
| 3,463,713 | 8/1969 | Bregmn et al. | 204/180 P |
| 4,024,036 | 5/1977 | Nakamura et al. | 204/129 |

FOREIGN PATENT DOCUMENTS 1417585  10/1965  France ............................ 204/296

OTHER PUBLICATIONS

Baetsle et al, J. Inorg. Nucl. Chem. vol. 30, pp. 639–649.

*Primary Examiner*—F. C. Edmundson
*Attorney, Agent, or Firm*—Stevens, Davis, Miller & Mosher

[57] ABSTRACT

The method comprises the steps of preparing a solution of a binder in a solvent, wetting and grinding polyantimonic powder, forming a suspension with the wetted and ground powder and the solvent, mixing the suspension with the solution, pouring on a plate the so obtained viscous liquid, allowing the solvent to evaporate until a membrane in formation begins to dry, removing further the solvent by lixiviation, and removing the membrane from the plate.

3 Claims, No Drawings

METHOD OF PREPARING A MEMBRANE CONSISTING OF POLYANTIMONIC ACID POWDER AND AN ORGANIC BINDER

BACKGROUND

The present invention relates to a method of preparing a membrane consisting of a polyantimonic acid powder and an organic binder.

Such a membrane intended for an electrochemical cell, wherein it counteracts gas diffusion and is conductive of cations in an alkaline medium or conductive of anions in an acid medium, is known from the U.S. Pat. application Ser. No. 868.800, now abandoned.

This known membrane is made by mixing polyantimonic acid powder with the binder, for instance with polytetrafluoro-ethylene, and agglomerating the powdery mixture through rolling operations.

A suchlike membrane fulfils its function of cation and anion conductor best when the weight concentration of the polyantimonic acid is fairly high, i.e. when it is ranging from 70 to 95% and preferably from 80 to 85%.

As a matter of fact, it has been found difficult in practice to prepare by this known method through rolling a membrane comprising about 80 wt % or more polyantimonic acid.

It has also been found difficult in practice to produce by this known method a membrane which is homogeneous in the whole of its thickness, being approximately 0,3 mm, and has good mechanical properties.

Finally, it has also been impossible to produce by the known process a membrane having an area which is much greater than a square decimeter.

THE INVENTION

The invention provides a method that remedies these drawbacks.

For this purpose, a solution of the binder is prepared in a solvent, the polyantimonic acid powder. is wetted with the same solvent, the wetted powder is ground, a suspension is formed with the so wetted and ground powder and the same solvent, the suspension is mixed with the solution, the so obtained viscous liquid is poured on a plate, the solvent is allowed to evaporate until a membrane in the process of formation begins to dry, the solvent is further removed by lixiviating and the membrane is removed from the plate.

FURTHER BACKGROUND

The U.S. Pat. No. 3,463,713 describes a method of preparing a membrane consisting of an organic binder and an inorganic ion conducting material included therein, according to which one prepares a solution of the binder in a solvent and adds thereto the inorganic ion conducting material, possibly as a suspension, pours the so obtained viscous liquid on a plate, allows the solvent to evaporate, hydrates the so produced membrane and removes same from the plate.

FURTHER TO THE INVENTION

The method according to the present invention differs from this known method amongst others through the selection of the inorganic material, that is to say polyantimonic acid.

The invention is also based on the idea that the polyantimonic acid can be worked into the membrane only with a sufficient fineness i.e. with a grain size which is smaller than 1 micrometer and preferably smaller than 0,1 micrometer, when it is ground in a wet state before being added in suspension to the binder solution.

If the polyantimonic acid is ground in a dry state, the grains agglomerate and the distribution of same in the membrane is less homogeneous.

Finally, should the solvent become completely evaporated from the membrane, there would be produced a brittle and uneven membrane, and it is necessary to stop the evaporation as soon as the membrane begins to dry, in order to further remove the solvent by lixiviation.

Polysulfone is preferably used as a binder.

Methylpyrolidone is preferably used as a solvent.

DESCRIPTION OF THE PREFERRED EMBODIMENT

Other features and advantages of the invention will become apparent from the following description of a method for preparing a membrane consisting of a polyantimonic acid powder and an organic binder according to the invention. This description is given only as an example and does not limit the invention.

In order to prepare a membrane, eight gram of polyantimonic acid are wetted by means of N-methylpyrolidone.

For this, it is possible to use polyantimonic acid powder with a grain size smaller than five micrometer and a specific area, called B.E.T. area of 25 $m^2/g$, which is obtainable on the market under the name of POLYAN from Applied Research, 1080 Brussels.

The wetted powder is ground until the grain size is smaller than 1 micrometer and preferably smaller than 0,1 micrometer.

A suspension is formed by means of the wet ground powder and twenty milliliter of N-methylpyrolidone.

A solution is formed of 2 gram polyarylethersulfone in twenty milliliter of N-methylpyrolidone.

For this, it is possible to use the polysulfone that is obtainable on the market under the name of UDEL from Union Carbide.

This solution is added to the suspension and the whole quantity is mixed at a temperature of approximately 70° C.

In this way there is obtained a viscous liquid, which is then poured on a plate.

The solvent, that is to say the methylpyrolidone, is allowed to partially evaporate in an oven at a temperature of approximately 70° C., but only until the viscous mass on the plate is sufficiently dry to show at the edges a change of colour from gray to white.

After this, the plate is immersed in water at a temperature of 0° to 2° C., so that the solvent further lixiviates.

Finally, the plate with the membrane produced thereon is put into streaming water, which allows the membrane to be removed.

The membrane as produced is slightly translucent and slightly flexible.

It is necessary to ensure that the evaporation takes place only partially, as described hereinabove, and to lixiviate the remaining solvent. If one removes the solvent completely through evaporation, one obtains a membrane which is transparent and brittle.

Apart from this, the partial removal of the solvent through lixiviation is necessary for obtaining a flat membrane with the required pore distribution.

The membrane as prepared according to the example which has been described has a thickness of approximately 0,1 to 0,3 mm. It is conducting anions in an acid medium and conducting cations in an alkaline medium.

In a concentrated alkaline medium, the chemical stability is ensured up to a temperature of 120° C. The gas separation is sufficient for allowing to use the membrane in an electrolytic cell.

When applying the membrane for electrolysing water in 5% by weight KOH and in 30% by weight KOH, at 70° C. in both cases, the following results have been obtained.

To the membrane were attached as a cathode a perforated nickel plate catalytically activated by means of $NiS_x$ and as an anode a perforated nickel plate catalytically activated by means of $NiCo_2O_4$.

The cell voltage $U_c$ as expressed in terms of the current density is varied as follows.

| i (kAm$^{-2}$) | $U_C$ (V) 5% by weight KOH | $U_C$ (V) 30% by weight KOH |
|---|---|---|
| 10 | 2.37 | 2.29 |
| 8 | 2.24 | 2.18 |
| 6 | 2.13 | 2.06 |
| 4 | 2.01 | 1.93 |
| 2 | 1.87 | 1.76 |
| 1 | 1.74 | 1.66 |
| 0.5 | 1.68 | 1.59 |
| 0.25 | 1.63 | 1.54 |

The measurements in 5% by weight KOH were carried out with a membrane with 80% by weight polyantimonic acid—20% by weight polysulfone and the measurements in 30% by weight KOH were carried out with a membrane with 67% by weight polyantimonic acid—33% by weight polysulfone.

Although the resistivity of the free electrolyte increases from 0.8 Ωcm for 30% by weight KOH at 70° C. to 2.7 Ωcm for 5% by weight KOH at 70° C., no noticeable increase in resistance of the membrane and cell voltage is experienced, because the quantity of polyantimonic acid in the membrane has been increased from 67% by weight to 80% by weight.

With a membrane produced according to the invention with 67% by weight polyantimonic acid, thus not yet optimalized as far as the polyantimonic acid concentration is concerned, current efficiencies have been measured in the chlorine electrolysis which are comparable with the ones obtained with a Nafion membrane (7 mil, EW 1200), as there appears from what follows.

When electrolysing a 20% to 25% by weight NaCl solution, the higher the cationic permselectivity of the membrane, the higher is the production of NaOH.

The smaller the quantity of OH− ions migrating to the anode through the membrane, the higher is the current efficiency that is defined as follows:

$$\eta\ (\%) = \frac{\text{measured increase in OH}^-}{\text{theoretical increase in OH}^-} \times 100$$

| NaOH concentration (normality) | current efficiency (%) | |
|---|---|---|
| | membrane according to the invention | Nafion ® (x) 7 mil, EW 1200 |
| 0.2 | 94 | 96 |
| 0.5 | 88 | 95 |
| 1 | 80 | 92 |
| 1.5 | 72.5 | 87 |
| 2 | 67 | 78 |
| 2.5 | 61 | 68 |

(x) W.G.F. Grot et al., "Perfluorinated Ion Exchange Membranes", the 141$^{st}$ National Meeting The Electrochem. Society, Houston, Texas, May 7-11 (1972).

The invention is not at all limited to the example described hereinabove and quite many changes can be made to the example described without going outside the scope of the present patent application.

The binding agent must not necessarily be polyarylethersulfone; it may also be another polysulfone; generally speaking, any given organic binder apt to bind the polyantimonic acid and to be put into solution in a solvent which can be evaporated and lixiviated may be used. As organic binders, amongst others, the following are also to be taken into consideration:

Polyvinylidene fluoride, known on the market as SOLEF from the Solvay Company, the product known on the market as HYPALON from the Dupont Company and the product known on the market as HALAR from the Allied Chemical Company.

The solvent which is used to form a solution with the binding agent and to form a suspension with the polyantimonic acid must not necessarily be methylpyrolidone; any liquid in which the binder is soluble and which can be evaporated and lixiviated may be used.

The lixiviation must not necessarily take place with water, but may, for instance, be carried out in an aqueous medium, for instance in $10^{-2}$ or $10^{-3}$ N HCl. Generally speaking, the lixiviation can be carried out with any liquid which is apt to be mixed with the liquid with which the solution of the binder and the suspension of the polyantimonic acid have been prepared.

We claim:

1. A method of preparing a membrane consisting of polyantimonic acid powder and an organic binder, comprising the steps of
   preparing a solution of the binder in a solvent,
   wetting the polyantimonic powder with the same solvent,
   grinding the wetted powder,
   forming a suspension with the wetted and ground powder and a same solvent,
   mixing the suspension with the solution,
   pouring on a plate the so obtained viscous liquid,
   allowing the solvent to evaporate until a membrane in process of formation begins to dry,
   removing further the solvent by lixiviation, and
   removing the membrane from the plate.
2. The method of claim 1, in which the binder is polysulfone.
3. The method of claim 1, in which the solvent is methylpyrolidone.

* * * * *